No. 730,888. Patented June 16, 1903.

UNITED STATES PATENT OFFICE.

JOSEPH W. DOWLER, OF ST. LOUIS, MISSOURI.

MILK PRODUCT AND PROCESS OF MAKING SAME.

SPECIFICATION forming part of Letters Patent No. 730,888, dated June 16, 1903.

Application filed March 18, 1901. Serial No. 51,774. (No specimens.)

*To all whom it may concern:*

Be it known that I, JOSEPH W. DOWLER, a citizen of the United States, and a resident of the city of St. Louis, State of Missouri, have invented a new and useful Milk Product and Process of Making Same, of which the following is a specification.

The principal object of the present invention is the utilization of sour milk, skimmed milk, and buttermilk, which are commonly wasted and are hereinafter referred to as "waste" milk.

It consists principally in acidifying and desiccating such waste milk.

It also consists in the process and in the product hereinafter more fully described and claimed.

In carrying out the present process dry acid calcium phosphate is thoroughly stirred up in water in the proportion of about one pound of the acid calcium phosphate to three pints of water. The acid calcium phosphate thus mixed with water is then added to skimmed milk or to buttermilk or to a mixture of skimmed milk and buttermilk in the proportion of about one pound of dry acid calcium phosphate to one hundred and sixty pounds of milk. The mixture of the milk and acid phosphate is then thoroughly stirred in order to subject all the milk particles to the action of the acid phosphate and is then allowed to stand in a place heated to about 100° to 110° Fahrenheit until the casein of the milk is thoroughly coagulated. This coagulation of the casein usually requires about two hours. The whey is then separated from the casein by draining it through cloths or fine-wire screens or other suitable filtering medium. The whey thus filtered is then concentrated by heat in shallow vessels, rapidly at first, but more slowly as the whey thickens. When the whey acquires the consistency of a thick syrup, it is mixed with the casein, from which it was separated by filtration. In this way all the sugar and mineral salts contained in the whey are retained in the mixture, so that none of the valuable constituents of the milk are lost in the process. To the mixture of concentrated whey and casein dry acid calcium phosphate is added in the approximate proportion of thirty pounds of phosphate to one hundred and sixty pounds of the original volume of skimmed milk. This mixture is thoroughly rubbed together, preferably in a mixer suitable for the treatment of material in the state of a magma. The magma thus thoroughly mixed is then dried and constitutes an acidified milk product ready for use.

It is obvious that my milk product is much more available and convenient for use in comminuted form than in large masses. For this reason it is preferable to shred or otherwise treat the magma, so that it is separated into thread-like or other thin strips. The thread-like strips thus formed dry quickly and may be easily granulated or comminuted. These operations may be performed by any suitable apparatus. The dried product thus formed may be used as an ingredient of a filler for pies, custards, puddings, confections, and the like. Its most important use, however, is as an ingredient for baking-powder. In the latter use it operates as the acid member to combine with the carbonate or alkali member for the liberation of carbon-dioxid gas. Its principal advantage as an ingredient for baking-powder rises from the fact that its acid phosphate and lactic acid are embedded physically in an envelop which becomes glutinous or tacky when moistened and which acts physically to retard the combination of the acid and the carbonate. This retarding action results in prolonging the period of generation of the carbon-dioxid gas, so that practically the full force of the gas is used in raising the dough.

When my milk product is used as an ingredient for baking-powder, it is preferable to have it of uniform strength—that is, to have a definite weight of it capable of releasing a definite amount of carbon-dioxid gas. For this purpose a small amount of tartaric acid or cream of tarter is added thereto, so that two and one-half parts, by weight, of the resulting mixture will be neutralized by one part, by weight, of sodium bicarbonate. The amount of tartaric acid or cream of tartar to be added will depend upon two considerations—first, the amount of lactic acid in the desiccated milk product, and, second, the rapidity of action required for the baking-powder. The amount of lactic acid depends itself upon the condition of the milk used, and the rapidity of action of the baking-powder depends upon the accessibility of the acid ingredients.

One of the principal advantages of my invention is that the lactic acid in the milk, which is not wholly dried out by heat, is utilized in part as an acid member of the baking-powder and that the viscid or tacky substances of the milk serve as physical envelops to retard and prolong the generation of gas. As the function of the enveloping substances is both to separate the acid and the alkali members during storage and to retard the solution of the acid upon the application of moisture, it is obvious that other substances of a viscid or tacky character which will retard the access of water to the acid—such, for instance, as gelatin—may be substituted for the milk product. As this action of the envelop is of a physical nature, the amount of gelatin used admits of considerable variation; but it is preferable to use an amount substantially equal to that of the viscid or tacky substances of the milk when used as an envelop. So, too, the proportions hereinbefore specified are not essential, but may be varied to a reasonable extent. I do not, therefore, wish to be limited to the particular process or proportions hereinbefore described. I do not, however, claim the combination of casein alone with calcium acid phosphate or a baking-powder consisting of calcium acid phosphate and carbonate and a filler used with casein alone, as my invention contemplates the use of whey as well as casein.

What I claim, and desire to secure by Letters Patent, is—

1. The process of treating waste milk, which consists in adding a coagulant thereto and then filtering, evaporating the filtrate to a thick consistency, and adding the filter residue thereto, and then adding acid calcium phosphate to the mixture and drying, substantially as described.

2. The process of treating waste milk, which consists in adding thereto acid calcium phosphate and then filtering, evaporating the filtrate to a thick consistency and adding the filter residue thereto, and then adding acid calcium phosphate to the mixture and drying, substantially as described.

3. The process of treating waste milk which consists in adding thereto a small percentage of acid calcium phosphate and then filtering, concentrating the filtrate and adding the filter residue thereto, and then mixing therewith acid calcium phosphate and drying, substantially as described.

4. The process of treating waste milk which consists in adding thereto a small percentage of acid calcium phosphate and then filtering, concentrating the filtrate and adding the filter residue thereto, and then mixing therewith acid calcium phosphate, and then drying the pasty mass in thread-like strips, substantially as described.

5. The process of treating waste milk which consists in adding thereto a small percentage of acid calcium phosphate and then filtering, concentrating the filtrate and adding the filter residue thereto, and then mixing therewith acid calcium phosphate and drying the pasty mass in thread-like strips, and then comminuting the dried product, substantially as described.

6. The process of treating waste milk which consists in adding thereto a small percentage of acid calcium phosphate and then filtering, concentrating the filtrate and adding the filter residue thereto, and then mixing therewith acid calcium phosphate in the proportion of about thirty pounds of phosphate to one hundred and sixty pounds of the original waste milk and drying, substantially as described.

7. The food product consisting of a desiccated mixture of waste milk and acid calcium phosphate, substantially as described.

8. A baking-powder comprising an acid member and an alkali member, said acid member consisting of a desiccated mixture of acid calcium phosphate and waste milk, substantially as described.

9. A baking-powder comprising an acid member and an alkali member, the acid member comprising a desiccated mixture of acid calcium phosphate and waste milk, in the proportion of about thirty pounds of phosphate to one hundred and sixty pounds of milk, substantially as described.

10. A baking-powder comprising an acid member and an alkali member, said acid member comprising a mixture of acid calcium phosphate and waste milk dried together and tartaric acid, substantially as described.

11. The process of treating waste milk which consists in evaporating the same to a thick consistency and then mixing therewith acid calcium phosphate and then drying, substantially as described.

JOSEPH W. DOWLER.

Witnesses:
HENRY A. KERSTING,
JAMES A. CARR.